(12) United States Patent
Taira et al.

(10) Patent No.: US 9,346,903 B2
(45) Date of Patent: May 24, 2016

(54) MODIFIED POLYTETRAFLUOROETHYLENE FINE POWDER AND MODIFIED POLYTETRAFLUOROETHYLENE MOLDED PRODUCT

(75) Inventors: Takahiro Taira, Settsu (JP); Hiroyuki Yoshimoto, Settsu (JP); Taketo Kato, Settsu (JP); Yasuhiko Sawada, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 11/667,443

(22) PCT Filed: Nov. 16, 2005

(86) PCT No.: PCT/JP2005/021058
§ 371 (c)(1),
(2), (4) Date: May 10, 2007

(87) PCT Pub. No.: WO2006/054612
PCT Pub. Date: May 26, 2006

(65) Prior Publication Data
US 2008/0020159 A1    Jan. 24, 2008

(30) Foreign Application Priority Data
Nov. 16, 2004    (JP) ................... 2004-331587

(51) Int. Cl.
*C08F 214/26* (2006.01)
*C08F 259/08* (2006.01)
*C08L 51/00* (2006.01)

(52) U.S. Cl.
CPC ............ *C08F 214/26* (2013.01); *C08F 259/08* (2013.01); *C08L 51/003* (2013.01); *Y10T 428/1352* (2015.01)

(58) Field of Classification Search
USPC .......... 526/206, 247, 255; 524/544, 545, 520; 525/902, 276
See application file for complete search history.

(56) References Cited

U.S. PATENT DOCUMENTS

| 3,929,934 A | 12/1975 | Moore et al. |
|---|---|---|
| 4,134,995 A | 1/1979 | Fumoto et al. |
| 4,391,940 A | 7/1983 | Kuhls et al. |
| 4,469,846 A | 9/1984 | Khan et al. |

(Continued)

FOREIGN PATENT DOCUMENTS

| EP | 0 126 559 A1 | 11/1984 |
|---|---|---|
| EP | 0 257 644 A2 | 3/1988 |

(Continued)

OTHER PUBLICATIONS

ASTM D 4895-04: "Standard Specification for Polytetrafluoroethylene (PTFE) Resin Produced From Dispersion".

*Primary Examiner* — Ellen S Wood
(74) *Attorney, Agent, or Firm* — Sughrue Mion, PLLC

(57) ABSTRACT

The present invention provides a modified polytetrafluoroethylene fine powder which can be processed into molded articles high in thermal stability, chemical resistance and transparency and for which the extrusion pressure can be lowered. The present invention is a modified polytetrafluoroethylene fine powder, wherein the cylinder extrusion pressure at a reduction ratio of 1600 is not higher than 50 MPa and the haze value of molded article a for measurement formed therefrom is not higher than 60.

6 Claims, 1 Drawing Sheet

(56) References Cited

U.S. PATENT DOCUMENTS

| | | | |
|---|---|---|---|
| 4,837,267 A | 6/1989 | Malhotra | |
| 4,840,998 A | 6/1989 | Shimizu et al. | |
| 4,908,410 A * | 3/1990 | Malhotra | 525/276 |
| 5,188,764 A | 2/1993 | Shimizu et al. | |
| 5,296,165 A | 3/1994 | Shimizu et al. | |
| 6,747,108 B1 * | 6/2004 | Hosokawa et al. | 526/206 |
| 2002/0035221 A1 * | 3/2002 | Kapeliouchko et al. | 526/250 |
| 2004/0102572 A1 | 5/2004 | Kubo et al. | |

FOREIGN PATENT DOCUMENTS

| | | |
|---|---|---|
| EP | 0 764 668 A | 3/1997 |
| EP | 1 172 379 A | 1/2002 |
| EP | 1 174 448 A | 1/2002 |
| EP | 1 306 407 A | 5/2003 |
| EP | 1 568 720 A1 | 8/2005 |
| EP | 1 574 530 A1 | 9/2005 |
| EP | 1 739 105 A | 1/2007 |
| JP | 37-4643 | 6/1937 |
| JP | 50-84650 | 7/1975 |
| JP | 50-84650 A | 7/1975 |
| JP | 51-36291 | 3/1976 |
| JP | 51-36291 A | 3/1976 |
| JP | 59-232109 A | 12/1984 |
| JP | 60-42446 A | 3/1985 |
| JP | 63-56532 A | 3/1988 |
| JP | 01-278506 A | 11/1989 |
| JP | 2-158651 A | 6/1990 |
| JP | 5-186532 | 7/1993 |
| JP | 09-087334 A | 3/1997 |
| JP | 2001-288227 A | 10/2001 |
| JP | 2002-47315 A | 2/2002 |
| WO | 97/02301 A | 1/1997 |
| WO | WO 00/02935 A1 | 1/2000 |
| WO | 03/044093 A1 | 5/2003 |
| WO | 2004/052953 A1 | 6/2004 |
| WO | 2004/056887 A1 | 7/2004 |
| WO | 2005/097847 A1 | 10/2005 |

* cited by examiner

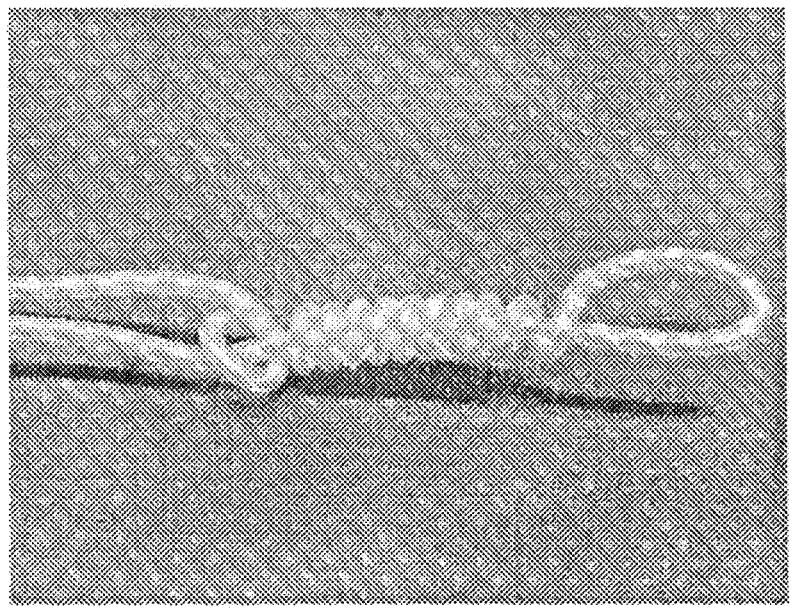

MODIFIED POLYTETRAFLUOROETHYLENE FINE POWDER AND MODIFIED POLYTETRAFLUOROETHYLENE MOLDED PRODUCT

TECHNICAL FIELD

The present invention relates to a modified polytetrafluoroethylene fine powder and to a modified polytetrafluoroethylene-based molded article.

BACKGROUND ART

Polytetrafluoroethylene (PTFE) has excellent chemical resistance, weather resistance and mechanical strength, among others, and, therefore, is utilized in the form of molded articles in various fields.

As a method of molding PTFE, there may be mentioned, for example, the technique of extrusion molding which comprises paste extrusion molding of a PTFE fine powder.

Industrially, the PTFE fine powder to be used in paste extrusion is preferably one excellent in paste extrudability, for example one for which the ratio between the cylinder cross-sectional area and the die opening cross-sectional area (i.e. reduction ratio [RR]) in the extruder on the occasion of paste extrusion is high and for which the extrusion pressure is low.

As for PTFE fine powders improved in paste extrudability, there have been proposed, for example, a particulate TFE resin each particle of which has a particle shell resulting from copolymerization of a specific modifier and which can be extruded at a RR of 1600 (cf. e.g. Patent Document 1: Japanese Patent Publication (Kokoku) S37-4643), and a modified tetrafluoroethylene polymer with a particle shell and an outermost particle shell respectively modified with chlorotrifluoroethylene [CTFE] at different levels of modification (cf. e.g. Patent Document 2: Japanese Kokai (Laid-open) Publication S51-36291).

However, such a particulate TFE resin still has problems, namely the extrusion pressure is still high and the thermal stability is unsatisfactory; and the modified tetrafluoroethylene polymer also has a problem in that the extrusion pressure is still high.

As for PTFE fine powders improved in paste extrudability, there have also been proposed, for example, one each particle of which has a particle core comprising fluoroalkyl vinyl ether-modified PTFE and a particle shell comprising CTFE-modified PTFE and which can be extruded at a RR of 2000 (cf. e.g. Patent Document 3: Japanese Kokai Publication S63-56532), and one each particle of which has a particle core comprising modified PTFE resulting from copolymerization with a fluotoalkylethylene in an amount smaller than 0.5% by weight relative to the whole particle and which can be extruded at a RR of 2000 (cf. e.g. Patent Document 4: Japanese Kokai Publication S60-42446 and Patent Document 5: Japanese Kokai Publication H05-186532). However, these PTFE fine powders have problems, namely they are unsatisfactory from the thermal stability and extrusion pressure viewpoint.

Further, as a PTFE fine powder improved in paste extrudability, there has been proposed one which is obtained by subjecting a perfluoroalkyl vinyl ether having a specific structure and TFE to copolymerization and, after consumption of at least 80% of TFE to be polymerized, introducing a chain transfer agent into the reaction system (cf. e.g. Patent Document 6: WO 00/02935). However, such a PTFE fine powder has a problem, namely it is unsatisfactory from the extrusion pressure viewpoint.

In certain instances, PTFE fine powders are preferably processed into tubes excellent in transparency according to the respective purposes. Mention is made of the transparency of the molded articles obtained from PTFE fine powders in some prior art documents (cf. e.g. Patent Document 3) but no specific data are described in any document.

DISCLOSURE OF INVENTION

Problems Which the Invention is to Solve

In view of the above-discussed state of the art, it is an object of the present invention to provide a modified polytetrafluoroethylene fine powder which can be processed into molded articles high in thermal stability, chemical resistance and transparency and for which the extrusion pressure can be lowered.

Means for Solving the Problems

The present invention is a modified polytetrafluoroethylene fine powder, wherein the cylinder extrusion pressure at a reduction ratio of 1600 is not higher than 50 MPa and the haze value of molded article a for measurement formed therefrom is not higher than 60 (hereinafter sometimes referred to as "modified PTFE fine powder (A)").

The present invention is a modified polytetrafluoroethylene fine powder constituting a particle core and a particle shell, wherein the particle core comprises a modified polytetrafluoroethylene (i) resulting from copolymerization with at least one species selected from the group consisting of a fluoro(alkyl vinyl ether) represented by the general formula (I):

$$F_2C=CFO(CF_2)_{n1}X^1 \quad (I)$$

(wherein $X^1$ represents hydrogen atom or fluorine atom and n1 represents an integer of 1 to 6), a vinylic heterocyclic compound represented by the general formula (II):

(II)

(wherein $X^2$ and $X^3$ are the same or different and each represents hydrogen atom or fluorine atom and Y represents $-CR^1R^2-$ in which $R^1$ and $R^2$ are the same or different and each represents fluorine atom, an alkyl group containing 1 to 6 carbon atoms or a fluoroalkyl group containing 1 to 6 carbon atoms) and a fluoroolefin represented by the general formula (III):

$$CX^4X^5=CX^6(CF_2)_{n2}F \quad (III)$$

(wherein $X^4$, $X^5$ and $X^6$ each represents hydrogen atom or fluorine atom provided that at least one of them represents fluorine atom; and n2 represents an integer of 1 to 5) and the particle shell comprises a modified polytetrafluoroethylene (ii), and the modified polytetrafluoroethylene fine powder has the cylinder extrusion pressure at a reduction ratio of 1600 of not higher than 50 MPa (hereinafter sometimes referred to as "modified PTFE fine powder (B)").

The present invention is a modified polytetrafluoroethylene molded article obtained by molding/processing a modified polytetrafluoroethylene fine powder, wherein the modified polytetrafluoroethylene fine powder is modified PTFE fine powder (A) or modified PTFE fine powder (B).

In the following, the present invention is described in detail.

The term "modified PTFE fine powder" as used herein without adding (A) or (B) conceptually means that it may include both the above-defined PTFE fine powder (A) and the above-defined PTFE fine powder (B) without any particular distinction.

The modified PTFE fine powder according to the invention is a fine powder comprising a modified PTFE. The modified PTFE fine powder can be obtained by emulsion polymerization as described later herein.

For the modified PTFE fine powder (A) of the invention, the cylinder extrusion pressure at a reduction ratio [RR] of 1600 is not higher than 50 MPa.

The above-mentioned cylinder extrusion pressure at RR=1600 is preferably not higher than 45 MPa, more preferably not higher than 40 MPa. Even when that pressure is not lower than 25 MPa, no trouble will be encountered industrially provided that it is within the above range.

The "cylinder extrusion pressure" so referred to herein is the value obtained by adding 17 parts by mass of a hydrocarbon oil (trademark: Isopar G; product of Exxon Chemical Company) as an extrusion auxiliary to 100 parts by mass of the modified polytetrafluoroethylene powder to be tested and extruding the mixture at room temperature (25±2° C.; hereinafter the same shall apply) at a reduction ratio of 1600.

When the cylinder extrusion pressure at RR=1600 is within the above range, the powder can be properly molded even under the condition that the RR is 3000 or higher; the powder can be molded into small-diameter electric wire coverings, tubes and so forth, hence is advantageous from the productivity viewpoint as well.

The above-mentioned modified PTFE fine powder (A) has a cylinder extrusion pressure at RR=1600 which falls under the above range and therefore is excellent in moldability and this excellent moldability is fully demonstrated in extrusion molding, in particular.

The modified PTFE fine powder (A) of the invention not only has a cylinder extrusion pressure within the above range but also gives molded article a for measurement having a haze value of not higher than 60.

The haze value is more preferably not higher than 55, still more preferably not higher than 53 and, within such range, it may be 40 or greater.

The above-mentioned molded article a for measurement is prepared by subjecting the modified PTFE fine powder (A) to compression molding using a mold with an inside diameter of 50 mm ø at a pressure of 20 MPa and at room temperature for a holding time of 5 minutes, followed by 1 hour of sintering at 380° C., and cutting 0.5-mm-thick sheets from the thus-obtained cylindrical molded body and sintering the sheets at 380° C. for 5 minutes in a hot air circulating electric oven and then rapidly cooling them to room temperature.

The haze value so referred to herein is the value obtained by subjecting molded article a for measurement to haze measurement according to ASTM D 1003 using a direct reading haze meter (product of Toyo Seiki Seisakusho, Ltd).

The modified PTFE fine powder (A) gives molded article a for measurement having a haze value within the range mentioned above and, therefore, is excellent in transparency and can be suitably used in forming molded article required to be transparent in view of the intended use thereof.

Preferably, the modified PTFE fine powder (A) of the invention not only has a cylinder extrusion pressure and gives a haze value within the respective ranges mentioned above but also gives molded article b for measurement having a tensile strength (hereinafter sometimes referred to also as "green strength") of not lower than 1.8 MPa.

A more preferred lower limit to the above tensile strength is 2 MPa and, even if it is not higher than 5 MPa, no trouble will be encountered in industrial utilization.

The above-mentioned molded article b for measurement is prepared by filling an extruder cylinder with a mixture of 50.00 g of the modified PTFE fine powder (A) and 10.25 g of an extrusion auxiliary (hydrocarbon oil, trademark: Isopar G, product of Exxon Chemical Company) at room temperature and, after 1 minute of retention, extruding the mixture immediately through the orifice at room temperature at a ram velocity of 20 mm/minute by applying a load of 5.7 MPa to the cylinder, followed by cutting to give a cylindrical molded article with a diameter of 0.63 mm, and cutting the molded article to a length of 80 mm.

The tensile strength mentioned above is measured by pulling molded article b for measurement at a rate of pulling of 200 mm/minute using an autograph (product of Shimadzu Corporation) and determining the maximum point strength thereof.

When the modified PTFE fine powder (A) of the invention gives molded article b for measurement having a tensile strength within the above range, extrusion molding thereof is easy even in the case of molded articles long in axial length, and the molded articles are excellent in resistance to cracking in the case of paste extrusion as well.

Preferably, the modified PTFE fine powder (A) of the invention not only has a cylinder extrusion pressure and gives a haze value within the respective ranges mentioned above but also has a thermal instability index [TII] of not higher than 6 as determined according to ASTM D 4895.

A more preferred upper limit to the TII is 3, and a still more preferred upper limit is 1.

When the modified PTFE fine powder (A) of the invention has a TII within the range mentioned above, it has very good thermal stability.

The TII can be determined from the following equation:

$$TII=(ESG-SSG)\times 1000$$

(In the above formula, ESG is the specific gravity of a PTFE molding weighing 12 g and having a specified shape according to ASTM D 4895 as measured after 6 hours of treatment at 380° C. and SSG is the standard specific gravity of the same PTFE molding weighing 12 g and having the specified shape as mentioned above as measured after 0.5 hour of treatment at 380° C.)

When the modified PTFE fine powder (A) of the invention has the constitution of the modified PTFE fine powder (B) of the invention described later herein, it can readily show the respective characteristic features mentioned above.

The modified PTFE fine powder (A) of the invention can be produced, for example, by the method of producing modified PTFE fine powders which is described later herein.

The modified PTFE fine powder (B) of the invention consists of particles each constituting a particle core and a particle shell.

The modified PTFE constituting the modified PTFE fine powder (B) occurs as primary particles in the polymerization reaction medium used for obtaining that modified PTFE. The primary particles may also be said to be polymer particles as polymerized. They aggregate together to constitute secondary particles in such a subsequent step as a coagulation step.

The modified PTFE fine powder (B) of the invention substantially comprises an aggregate of secondary particles. The aggregate of secondary particles constituting the modified PTFE fine powder (B) of the invention may be a powder obtained by subjecting the polymerization reaction mass after completion of the polymerization reaction to coagulation and drying treatment or a ground product obtained by milling the powder mentioned above for particle size adjustment, for instance.

The terms "particle core" and "particle shell" as used herein referring to the modified PTFE fine powder (B) of the invention describe the structure of the primary particles constituting the secondary particles or ground product mentioned above.

The primary particles constituting the modified PTFE finer powder (B) of the invention are considered to have a layered structure comprising a particle core and a particle shell. It is not always necessary, however, for a distinct boundary to exist between both the particle core and particle shells. Thus, the modified PTFE (i), which is described later herein and constitutes the particle core, and the modified PTFE (ii), which is described later herein and constitutes the particle shell, may be intermingled with each other in the vicinity of the boundary between the particle core and particle shell.

For attaining a decrease in extrusion pressure, the modified PTFE fine powder (B) of the invention preferably has a particle core content of 85 to 95% by mass relative to the sum of the particle core and particle shell. A more preferred lower limit thereto is 87% by mass, and a more preferred upper limit is 93% by mass. The sum of the particle core and particle shell includes that vicinity of the boundary between both the portions mentioned above, which is not always clearly definable.

The particle core in the modified PTFE fine powder (B) of the invention preferably comprises a modified polytetrafluoroethylene [modified PTFE] (i) resulting from copolymerization with at least one species selected from the group consisting of a fluoro(alkyl vinyl ether) represented by the general formula (I):

$$F_2C=CFO(CF_2)_{n1}X^1 \quad (I)$$

(wherein $X^1$ represents hydrogen atom or fluorine atom and n1 represents an integer of 1 to 6), a vinylic heterocyclic compound represented by the general formula (II):

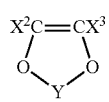

(II)

(wherein $X^2$ and $X^3$ are the same or different and each represents hydrogen atom or fluorine atom and Y represents $—CR^1R^2—$ in which $R^1$ and $R^2$ are the same or different and each represents fluorine atom, an alkyl group containing 1 to 6 carbon atoms or a fluoroalkyl group containing 1 to 6 carbon atoms) and a fluoroolefin represented by the general formula (III):

$$CX^4X^5=CX^6(CF_2)_{n2}F \quad (III)$$

(wherein $X^4$, $X^5$ and $X^6$ each represents hydrogen atom or fluorine atom provided that at least one of them represents fluorine atom; and n2 represents an integer of 1 to 5).

The term "modified polytetrafluoroethylene [modified PTFE]", when used herein without adding (i) or (ii), conceptually means that the modified PTFE may include, within the meaning thereof, both the above-mentioned modified PTFE (i) and the modified PTFE (ii) described later herein, without any particular distinction therebetween.

Referring to the fluoro(alkyl vinyl ether) represented by the general formula (I) given above, the integer n1 is preferably 1 to 4 and, more preferably, n1 is not greater than 3.

Also preferred as the fluoro(alkyl vinyl ether) represented by the general formula (I) are perfluoro(alkyl vinyl ether) species in which $X^1$ is fluorine atom.

As the perfluoro(alkyl vinyl ether) species there may be mentioned, for example, perfluoro(methyl vinyl ether) [PMVE], perfluoro(ethyl vinyl ether) [PEVE], perfluoro(propyl vinyl ether) [PPVE] and perfluoro(butyl vinyl ether) [PBVE], among others.

Preferred as the vinylic heterocyclic compound represented by the general formula (II) given above are, for example, those in which $X^2$ and $X^3$ each is fluorine atom and those in which $R^1$ and $R^2$ each is a fluoroalkyl group containing 1 to 6 carbon atoms.

Preferred as the vinylic heterocyclic compound represented by the general formula (II) is perfluoro-2,2-dimethyl-1,3-dioxole [PDD], namely the compound of formula (II) in which $X^2$ and $X^3$ each is a fluorine atom and $R^1$ and $R^2$ each is a perfluoromethyl group.

Preferred as the fluoroolefin represented by the general formula (III) given above is HFP (hexafluoropropylene).

A monomer or monomers other than tetrafluoroethylene [TFE], which serve to constitute the modified PTFE, are sometimes referred to herein as "modifiers".

As for the modifiers for the above-mentioned particle core, fluoro(alkyl vinyl ether) species represented by the general formula (I) given above are preferred and, in particular, those of general formula (I) in which $X^1$ represents fluorine atom and n2 represents an integer of 1 to 3 are more preferred; perfluoro(propyl vinyl ether) [PPVE] is still more preferred.

The modified PTFE (i) mentioned above may be one obtained by using two modifiers, such as a TFE-based ternary copolymer obtained by copolymerization with a fluoro(alkyl vinyl ether) represented by the general formula (I) and a fluoroolefin represented by the general formula (III). As an example of the modified PTFE (i) obtained by using two modifiers, there may be mentioned, among others, a TFE-based ternary copolymer obtained by copolymerization with PPVE and HFP.

The modifier-derived modifier unit content in the particle core is preferably 0.01 to 0.5% by mass based on all the primary particles constituting the modified PTFE fine powder (B) from the improved transparency viewpoint, although that content may vary depending on the kind of the modifier(s) used. A more preferred lower limit thereto is 0.02% by mass, a still more preferred lower limit is 0.08% by mass, and a more preferred upper limit is 0.2% by mass.

When PPVE is used as the comonomer in the particle core, the modifier-derived modifier unit content in the particle core is preferably 0.01 to 0.5% by mass based on all the primary particles constituting the modified PTFE fine powder (B); a more preferred lower limit thereto is 0.02% by mass, and a more preferred upper limit is 0.2% by mass.

The term "modifier unit" as used herein means the repeating unit resulting from the comonomer used as the modifier and constituting a part of the molecular structure of the modified PTFE. When PPVE, for instance, is used as the modifier, the modifier unit is represented by $—[CF_2—CF(—OC_3F_7)]—$ and, when HFP is used, the modifier unit is represented by $—[CF_2—CF(—CF_3)]—$.

When the modified PTFE (i) contains two or more modifier units, the above-mentioned modifier unit content is the total content of the respective modifier units.

The particle shell in the modified PTFE fine powder of the invention comprises the modified polytetrafluoroethylene [modified PTFE] (ii).

The modified PTFE (ii) is a tetrafluoroethylene polymer modified without impairing the characteristics of the corresponding tetrafluoroethylene homopolymer.

In the present specification, the modification in the above-mentioned modified PTFE (ii) may be the result of copolymerization of a modifier which is a monomer copolymerizable with TFE, or of addition of a chain transfer agent in the step of polymerization, or of a combination of both of these.

The modification in the modified PTFE (ii) in the particle shell of the modified PTFE fine powder (B) of the invention is preferably carried out by using a chain transfer agent and/or by copolymerizing a fluoro(alkyl vinyl ether) represented by the general formula (I):

$$F_2C=CFO(CF_2)_{n1}X^1 \qquad (I)$$

(wherein $X^1$ represents hydrogen atom or fluorine atom and n1 represents an integer of 1 to 6) or a fluoroolefin represented by the general formula (III):

$$CX^4X^5=CX^6(CF_2)_{n2}F \qquad (III)$$

(wherein $X^4$, $X^5$ and $X^6$ each represents hydrogen atom or fluorine atom provided that at least one of them represents fluorine atom; and n2 represents an integer of 1 to 5).

The chain transfer agent to be used for the modification in the particle shell is not particularly restricted but may be any of those capable of reducing the molecular weight of the modified PTFE (ii) constituting the particle shell, for example, those comprising a non-peroxide organic compound such as a water-soluble alcohol, a hydrocarbon or a fluorinated hydrocarbon, a water-soluble organic peroxide such as disuccinoyl peroxide [DSP] and/or a persulfate salt such as ammonium persulfate [APS] or potassium persulfate [KPS].

The chain transfer agent may be one comprising at least one species selected from among non-peroxide organic compounds, water-soluble organic peroxides and persulfates.

Among such chain transfer agents, use can be made of one or more species of the non-peroxide organic compounds, water-soluble organic peroxides and/or persulfates.

From the viewpoint of good dispersibility and uniformity in the reaction system, the chain transfer agent preferably comprises at least one member selected from the group consisting of water-soluble alcohols containing 1 to 4 carbon atoms, hydrocarbons containing 1 to 4 carbon atoms and fluorinated hydrocarbons containing 1 to 4 carbon atoms, more preferably comprises at least one member selected from the group consisting of methane, ethane, n-butane, isobutane, methanol, HFC-134a, HFC-32, DSP, APS and KPS, and still more preferably comprises methanol and/or isobutane.

The modifier to be used as the comonomer for the modification in the particle shell is preferably a fluoroolefin represented by the general formula (III) given above.

As the fluoroolefin, there may be mentioned perfluoroolefins containing 2 to 4 carbon atoms and hydrogen-containing fluoroolefins containing 2 to 4 carbon atoms.

Preferred as the fluoroolefin are perfluoroolefins; and hexafluoropropylene [HFP] is preferred among others.

From the improved green strength viewpoint, the content of the modifier unit derived from the modifier used as the comonomer in the above-mentioned particle shell is preferably 0.001 to 0.5% by mass based on all the primary particles constituting the modified PTFE fine powder (B), although it may vary depending on the kind of the modifier used; a more preferred lower limit thereto is 0.005% by mass, a more preferred upper limit is 0.2% by mass and a still more preferred upper limit is 0.10% by mass. When HFP is used as the comonomer in the particle shell, the comonomer unit content is preferably 0.001 to 0.3% by mass based on all the primary particles constituting the modified PTFE fine powder (B); a more preferred lower limit is 0.005% by mass, and a more preferred upper limit is 0.15% by mass.

For lowering the extrusion pressure to be mentioned later herein, either the use of a chain transfer agent or the copolymerization of a modifier is sufficient for the modification in the above-mentioned modified PTFE (ii). From the viewpoint of improving the tensile strength of molded article b for measurement as measured in the manner described later herein, however, the combination of both the copolymerization of a modifier and the use of a chain transfer agent is preferred.

When a fluoro(alkyl vinyl ether) represented by the general formula (I) given hereinabove, in particular PPVE, is used as the modifier in the modified PTFE (i) constituting the particle core, the modification in the modified PTFE (ii) is preferably carried out by using methanol, isobutane, DSP and/or APS as the chain transfer agent and, at the same time, by copolymerizing HFP and/or PPVE as the modifier, more preferably by using methanol and HFP.

The modified PTFE fine powder (B) of the invention comprises primary particles having the particle core and particle shell having the respective structures described hereinabove and requires a cylinder extrusion pressure at reduction ratio [RR]=1600 of not higher than 50 MPa.

The cylinder extrusion pressure is as described hereinabove referring to the modified PTFE fine powder (A) of the invention, and a preferred upper limit thereto is 45 MPa, a more preferred upper limit is 40 MPa, and it may be 25 MPa or higher.

The modified PTFE fine powder (B) of the invention can be readily obtained as one capable of giving the same molded article a for measurement as mentioned above which have a haze value of not higher than 60.

Unlike TFE homopolymers, the above-mentioned modified PTFE fine powder (B) contains side chains and/or non-fluorine atoms bound to the main chain at least in the particle core. Therefore, presumably, the crystallinity is reduced, and the powder (B) can be processed into molded articles having a high level of transparency with a low content of microcrystals which cause light scattering.

A preferred upper limit to the haze value mentioned above is 55, a more preferred upper limit is 53, and a preferred lower limit is 35, although the haze value may be 40 or higher.

The modified PTFE fine powder (B) of the invention can also be readily obtained as such one that the above-mentioned molded article b for measurement prepared therefrom show a tensile strength of not lower than 1.8 MPa. The tensile strength may be 4 MPa or lower or 3 MPa or lower, for instance, provided that it is within the range mentioned above.

The modified PTFE fine powder (B) of the invention can also be readily obtained as such one that the thermal instability index [TII] thereof as determined according to ASTM D 4895 is not higher than 6. A preferred upper limit to the TII is 3, a more preferred upper limit is 1, a preferred lower limit is −4, and a more preferred lower limit is 0 (zero).

It is possible for the modified PTFE fine powder (B) of the invention to be such one that the cylinder extrusion pressure therefor is within the range mentioned above and, at the same time, measurement target covered wire specimens a prepared therefrom show a cable core adhesion strength of not lower than 1.5 kgf as measured according to MIL-C-17.

The measurement target covered wire specimens a mentioned above are covered-wires with a covering layer thickness of 0.58 mm as obtained by (1) mixing 2 kg of the modified PTFE fine powder with 16% by mass (381 g) of an extrusion auxiliary (Isopar G) and, after 12 hours of maturation at ordinary temperature, passing the mixture through a 10-mesh SUS stainless steel wire net, preforming the same using a preformer (product of Tabata Industrial Machinery Co., Ltd.), (2) extruding the thus-obtained preformed body (parison) using a ø 50 mm wire covering extruder (product of Tabata Industrial Machinery Co., Ltd.), (3) drying and (4) sintering, followed by cooling.

The various conditions to be employed in the above steps (1) to (4) are the same as described later herein in the example section.

The above-mentioned modified PTFE fine powder (B), which shows a cable core adhesion strength within the above range as determined for the measurement target covered wire specimens a prepared in the above manner, can be suitably used as a material for the manufacture of various covered electric wires.

The modified PTFE fine powder (B) of the invention can give molded articles showing good crack resistance even at high temperatures. Thus, for example, self-wound heat resistance test specimens prepared by bending the above-mentioned measurement target covered wire a to a narrow U-shaped form and winding one arm 10 times around the other, followed by allowing the same to stand at 335° C. for 2 hours, taking out the same into an ordinary temperature atmosphere and allowing the same to stand for cooling can be crack-free molded articles.

The self-wound heat resistance test specimens referred to herein are prepared by the method described later herein in the example section.

When the particle core comprises a TFE-based ternary copolymer obtained by copolymerization with two modifiers, the modified PTFE fine powder (B) of the invention can be such one that it shows, in particular, a dielectric loss tangent at 12 GHz of not greater than $2.0 \times 10^{-4}$, preferably not greater than $1.72 \times 10^{-4}$.

The "dielectric loss tangent" so referred to herein is the value obtained by subjecting film-shaped specimens to measurement for changes in resonance frequency and electric field strength at a temperature of 20 to 25° C. using a cavity resonator. In the case of measurement using a cavity resonator, the resonance frequency lowers as compared with 12 GHz. In the present specification, however, the dielectric loss tangent value as obtained is expressed in terms of no-load frequency value. The film-shaped specimens are obtained by compression molding the modified PTFE fine powder into a cylinder with a diameter of 50 mm, cutting out films from this cylinder, sintering them at 380° C. for 5 minutes, gradually cooling them to 250° C. at a cooling rate of 60° C./minute, maintaining them at 250° C. for 5 minutes and then allowing them to cool to ordinary temperature.

When the specimens have a dielectric loss tangent at 12 GHz within the above range, the material, as a dielectric material for such transmission products as coaxial cables, can attain good transmission characteristics in the microwave band (3 to 30 GHz) or UHF (ultrahigh frequency) band (<3 GHz).

When the modified PTFE (i) in the particle core thereof has a modifier unit content in the above-mentioned preferred range, the modified PTFE fine powder (B) can readily show a dielectric loss tangent within the range mentioned above.

The modified PTFE fine powder (B) of the invention, which has the constitution described above, can give molded articles preferably excellent in transparency, green strength and thermal stability expressed in terms of TII, among others, at low extrusion pressure levels.

The mechanisms by which the modified PTFE fine powder (B) produces such marked effects are not clear. Since, however, it is composed of those primary particles whose particle core comprises the modified PTFE (i) modified with the specific modifier mentioned above and whose particle shell comprises the modified PTFE (ii), it is presumable that such core/shell structure lowers the extrusion pressure, the structure of the particle core contributes mainly toward the transparency and the thermal stability expressed in terms of TII and the structure of the particle shell contributes mainly toward sufficient lowering of the extrusion pressure and improvements in green strength. Further, presumably, the fact that the primary particles constituting the modified PTFE fine powder (B) have a core/shell structure, the fact that the particle core comprises the above-mentioned specific modified PTFE and the fact that the particle shell comprises the above-mentioned specific modified PTFE can synergistically produce the marked effects mentioned above.

The modified PTFE fine powder of the invention can be produced, for example, by subjecting a modified PTFE aqueous dispersion obtained by carrying out the polymerization reaction for producing the modified PTFE to coagulation, followed by drying of the coagulated matter.

A preferred method of producing the modified PTFE constituting the modified PTFE fine powder mentioned above is a method of producing a tetrafluoroethylene polymer which comprises:

(1) the step of feeding, at the initial stage of the polymerization reaction, at least one species selected from the group consisting of a fluoro(alkyl vinyl ether) represented by the general formula (I) given hereinabove, a vinylic heterocyclic compound represented by the general formula (II) given hereinabove and a fluoroolefin represented by the general formula (III) given hereinabove to the reaction system and carrying out the polymerization reaction, and (2) the step of introducing a chain transfer agent and/or a fluoro(alkyl vinyl ether) represented by the general formula (I) or a fluoroolefin represented by the general formula (III) into the reaction system following the above-mentioned step (1).

The above-mentioned step (1) is preferably carried out until the conversion of TFE used in the whole process, including the above steps (1) and (2), for the tetrafluoroethylene polymer production arrives at 85 to 95%.

The "conversion" so referred to herein is the percentage of that amount of TFE consumed during the period from the start of the polymerization to a certain point of time during polymerization to the amount of TFE corresponding to the intended TFE unit content.

In the above-mentioned steps (1) and (2), the process for producing the tetrafluoroethylene polymer can be carried out under reaction conditions properly selected according to the modifier species employed and the desired composition and yield of the modified PTFE, among others.

The above-mentioned method of producing the tetrafluoroethylene polymer can be carried out in an aqueous medium in the presence of a water-soluble dispersant as an emulsifier. Usable as the emulsifier are halogen-containing emulsifiers and hydrocarbon-based emulsifiers, among others.

The aqueous medium is a medium comprising water. The aqueous medium may contain, in addition to water, a polar organic solvent.

The polar organic solvent includes, among others, nitrogen-containing solvents such as N-methylpyrrolidone

[NMP]; ketones such as acetone; esters such as ethyl acetate; polar ethers such as diglyme and tetrahydrofuran [THF]; and carbonate esters such as diethylene carbonate. One or a mixture of two or more of them may be used.

The water-soluble dispersant mentioned above may be a nonionic surfactant, anionic surfactant, cationic surfactant or amphoteric surfactant but preferably is an anionic surfactant or nonionic surfactant.

The water-soluble dispersant can be used in an amount of 0.02 to 0.3% by mass of the aqueous medium mentioned above.

The above-mentioned method of producing the tetrafluoroethylene polymer can be carried out using a polymerization initiator, for example a persulfate such as ammonium persulfate [APS] or a water-soluble organic peroxide such as disuccinoyl peroxide [DSP]. The polymerization initiator may comprise one single species or a combination of two or more species. APS and DSP are preferred among others since they are also effective as such chain transfer agents as mentioned above.

The method of producing the tetrafluoroethylene polymer is preferably carried out in the presence of 0.0001 to 0.02 part by mass of the polymerization initiator per 100 parts by mass of the aqueous medium.

The method of producing the tetrafluoroethylene polymer can be carried out at a polymerization temperature of 10 to 95° C. When a persulfate salt or water-soluble organic peroxide is used as the polymerization initiator, however, it is preferably carried out at 60 to 90° C.

The method of producing the tetrafluoroethylene polymer can be carried out generally at 0.5 to 3.9 MPa, preferably 0.6 to 3 MPa.

The method of producing the tetrafluoroethylene polymer can also be carried out in such a manner that the reaction is carried out at a pressure of not higher than 0.5 MPa in the initial stage of polymerization, in particular until arrival of the conversion of TFE at a level within the range not higher than 15% of the whole amount, and thereafter the pressure is maintained at a level exceeding 0.5 MPa or, alternatively, in such a manner that the reaction pressure is reduced to a level not higher than 0.1 MPa, for instance, during the formation of the particle core and then TFE is again fed and the reaction is carried out at the predetermined adequate pressure.

The modified PTFE aqueous dispersion obtained from the above-mentioned polymerization of TFE is a dispersion comprising primary particles of the modified PTFE as dispersed in the aqueous medium mentioned above. The primary particles constitute the dispersoid as polymerized and not yet subjected to such after-treatment steps as the coagulation step.

The modified PTFE aqueous dispersion generally has a solid content of 20 to 40% by mass.

The coagulation mentioned above can be carried out by a method known in the art, and a water-soluble organic compound, basic compound-derived inorganic salt or like coagulation promoter may properly be added. The step of coagulation may also be carried out with addition, prior to or during coagulation, of a pigment for the purpose of coloration and/or a filler for the purpose of providing electric conductivity and producing improvements in mechanical properties.

The step of drying mentioned above can be carried out generally at a temperature of 100 to 250° C. The drying is preferably carried out for a period of 5 to 24 hours.

When the drying temperature in the drying step is high, the flowability of the powder is improved but the paste extrusion pressure for the modified PTFE fine powder obtained may become high in some instances. Therefore, great caution is needed in temperature setting.

The modified PTFE molded article of the invention is a modified PTFE-based molded article obtained by molding/processing a modified PTFE fine powder, wherein the modified PTFE fine powder is the above-mentioned modified PTFE fine powder of the invention.

The molding process mentioned above is not particularly restricted but is generally carried out in the manner of paste extrusion.

The paste extrusion can be carried out under conditions properly selected according to the geometry of the desired molded articles and the intended use thereof, among others. For example, the paste extrusion molding process can be carried out by adding an extrusion auxiliary, allowing the resulting mixture to mature for about 1 to 24 hours, preforming the mixture at a pressure of 0.5 to 2.0 MPa, and extruding the preformed mass at an extrusion pressure of 2 to 100 MPa, followed by sintering or baking at 360 to 450° C.

The modified PTFE molded article according to the invention can be suitably used, for example, in or as printed circuit boards, electric wire coverings, tubes and like molded articles required to have thermal stability and chemical resistance in the fields of aircrafts, automobiles, medical instruments and devices, precision machines and instruments, etc. Especially, they are preferably used as wire coverings required to be superior in core adhesion strength, among others, or as tubes for medical use.

As for the electric wire coverings, the molded articles are suitable as coverings for covering such core conductors as copper wires. As for the covered wires comprising a core or cores and such a wire covering material as mentioned above, heatproof cables, coaxial cables and the like are preferred, and heatproof cables are more preferred.

Effects of the Invention

The modified PTFE fine powder of the invention, which has the constitution described hereinabove, is superior in paste extrusion performance and can be processed into molded articles excellent in transparency, thermal stability and chemical resistance, among others.

The modified PTFE-based molded article of the invention, which has the constitution described hereinabove, is excellent in transparency, thermal stability and chemical resistance, among others.

BEST MODES FOR CARRYING OUT THE INVENTION

The following examples and comparative examples illustrate the present invention in further detail. These examples and comparative examples are, however, by no means limitative of the scope of the invention.

In the examples and comparative examples, the following measurements were carried out.
(1) Polymer Concentration A 10-gram portion of the modified polytetrafluoroethylene [modified PTFE] aqueous dispersion was placed in a laboratory dish and heated at 150° C. for about 3 hours, and the remaining solid was weighed. The polymer concentration was calculated as the percentage of the mass of the solid to the mass of the modified PTFE aqueous dispersion.
(2) Average Particle Diameter Each of several different modified PTFE aqueous dispersions was adjusted to a solid content of 0.15% by mass and placed in a cell and the transmissivity upon incidence of light at 550 nm was measured and, separately, the number average primary particle diameter was calculated based on the Feret diameter (perpendicular distance between parallel lines, tangent to the perimeter at opposite sides of a 2D object in a certain direction) data obtained from a transmission electron photomicrograph. A working curve indicating the transmissivity-particle diameter correlation thus found was constructed, and the average particle diameter of each sample was determined based on the working curve obtained and the transmissivity measured as described above.

(3) Particle Core Percentage

The particle core percentage was calculated as the mass ratio between the monomer amount consumed after start of the polymerization but before modifier addition and the monomer amount consumed in the whole polymerization reaction process.

(4) Particle Core and Particle Shell Modification Degrees

A sample was collected after start of the polymerization but before modifier addition and subjected to nuclear magnetic resonance spectrometry, and the particle core modification degree was determined based on the spectral data. Then, the overall modification degree was determined for the tetrafluoroethylene polymer finally obtained, and the particle shell modification degree was determined in comparison with the particle core modification degree.

(5) Standard Specific Gravity [SSG]

The SSG was measured by the water displacement method according to ASTM D 4895-89.

(6) Thermal Instability Index [TII]

The TII was measured according to ASTM D 4895-89.

(7) Tensile Strength Before Baking/Sintering (Green Strength)

Each molded article b for measurement was pulled at a rate of pulling of 200 mm/minute using an autograph (product of Shimadzu Corporation) and the maximum point strength thereof at room temperature was measured. The molded article b for measurement was a cylindrical molding with a diameter of 0.63 mm and a length of 80 mm as prepared by mixing 50.00 g of the modified PTFE powder with 10.25 g of an extrusion auxiliary (trademark: Isopar G; product of Exxon Chemical Company) in a glass bottle, allowing the mixture to mature at room temperature (25±2° C.) for 1 hour, filling an extruder cylinder with the mixture obtained at a pressure of 2 MPa and at room temperature and, after 1 minute of retention, extruding the mixture immediately through the orifice at a ram velocity of 20 mm/minute by applying a load of 5.7 MPa to the piston inserted into the cylinder.

(8) Extrusion Pressure

The extrusion pressure was measured at a reduction ratio of 1600 using an extruder according to ASTM D 4895. First, 50.00 g of the modified. PTFE powder and 10.25 g of an extrusion auxiliary hydrocarbon (trademark: Isopar G; product of Exxon Chemical Company) were mixed up in a glass bottle, and the mixture was allowed to mature at room temperature (25±2° C.) for 1 hour.

Then, the extruder cylinder was filled with the above mixture and, after 1 minute of retention at room temperature, the mixture was immediately extruded through the orifice at room temperature at a ram velocity of 20 mm/minute by applying a load of 5.7 MPa to the piston inserted into the cylinder. The value obtained by dividing the load (in N) at the point of time at which the extrusion procedure brought the pressure into an equilibrium state by the cylinder sectional area was reported as the extrusion pressure (in MPa).

(9) Haze Value

The haze value of each measurement target sample a was measured according to ASTM D 1003 using a direct reading haze meter (product of Toyo Seiki Seisakusho, Ltd.). The measurement target sample a was prepared by compression molding using a mold with an inside diameter of 50 mm ø at a pressure of 20 MPa and at room temperature for a holding time of 5 minutes, followed by 1 hour of baking/sintering at 380° C., and by cutting a 0.5-mm-thick sheet from the thus-obtained cylindrical molded body and baking/sintering the sheet at 380° C. for 5 minutes in a hot air circulating electric oven and then rapidly cooling it to room temperature.

(10) Core Conductor Adhesion Strength

Each measurement target covered wire a was subjected to measurement according to MIL-C-17.

The measurement target covered wire a was a covered wire with a covering layer thickness of 0.58 mm as obtained by (i) mixing 2 kg of the modified PTFE fine powder with 16% by mass (381 g) of an extrusion auxiliary (Isopar G) and, after 12 hours of maturation at ordinary temperature, passing the mixture through a 10-mesh SUS stainless steel wire net, preforming the same using a preformer (product of Tabata Industrial Machinery Co., Ltd.), (ii) extruding the thus-obtained preformed body using a ø 50 mm wire covering extruder (product of Tabata Industrial Machinery Co., Ltd.), (iii) drying and (iv) baking/sintering, followed by cooling.

The preforming step (i) was carried out at a ram velocity of 100 mm/minute and at a pressure of 3 MPa in an ordinary temperature atmosphere for 10 minutes. In the preformed body extrusion step (ii), a nickel-plated copper wire with an AWG of 24 and an outside diameter of 0.511 mm was used as the core conductor, and the preformed body was extruded at a ram velocity of 13 mm/minute and a core conductor velocity of 10 m/minute. In the drying step (iii), the extrudate obtained from the step (ii) was passed through the capstan set at 160° C. and then passed through a drying oven in which temperatures of 200° C., 250° C. and 280° C. were set stepwise and, in the baking/sintering step (iv), the covered wire was passed through a baking/sintering oven, in which the temperature was set stepwise from 280° C. to 400° C., at a rate of 10 m/minute.

(11) Self-Wound Heat Resistance

A self-wound heat resistance test specimen was maintained at 335° C. for 2 hours, then taken out into an ordinary temperature atmosphere and allowed to cool, and the cracks that had appeared in the wound portions (the corresponding portions of the measurement target covered wire a1 as described below), if any, were counted by macroscopic observation.

The above self-wound heat resistance test specimen was prepared by bending the measurement target covered wire a into a U shape at an arbitrary site p1 in the core conductor direction to form one arm (measurement target covered wire a1) and the other arm (measurement target covered wire a2) in the measurement target covered wire a, with the site p1 as the boundary therebetween, bringing a site p2 distant by 50 mm from the site p1 in the measurement target covered wire a1 into contact with the measurement target covered wire a2, winding the measurement target covered wire a1 around the measurement target covered wire a2 10 times starting from the site of contacting and, after 10 windings, tying the measurement target covered wire a1 to the measurement target covered wire a2 for fixation. The winding procedure was carried out in such a manner that the n-th winding was in contact with the (n−1)th winding of the measurement target covered wire a1, as shown by the photograph in FIG. 1.

EXAMPLE 1

A stainless steel (SUS 316) autoclave (capacity: 6 L) equipped with a stainless steel (SUS 316) anchor-shaped stirrer and a jacket for temperature control was charged with 3580 g of deionized water, 94.1 g of paraffin wax and 3.58 g of ammonium perfluorooctanoate as a dispersant. Then, while heating the autoclave to 70° C., the oxygen in the system was eliminated by 3 times of nitrogen gas substitution and 2 times of tetrafluoroethylene [TFE] gas substitution. Thereafter, the inside pressure was raised to 0.73 MPa with TFE gas, the contents were stirred at 280 rpm, and the inside temperature was maintained at 70° C.

Then, 2.9 g of perfluoro(propyl vinyl ether) [PPVE] was injected into the autoclave as an initially introduced modifier, followed by injection of a solution of 322 mg of disuccinoyl peroxide [DSP] in 20 g of deionized water and a solution of 13.4 mg of ammonium persulfate [APS] in 20 g of deionized water; the autoclave inside pressure was 0.78 MPa.

At the time of arrival of the consumption of TFE by the reaction at 1490 g (90% conversion), 14.2 of hexafluoropropylene [HFP] was fed as an additional modifier, and the reaction was allowed to proceed further.

Since otherwise the autoclave inside pressure lowered with the progress of the reaction, TFE was continuously fed to always maintain the pressure of 0.78 MPa throughout the whole reaction process. The rate of stirring was maintained at a constant level of 280 rpm, and the reaction temperature at a constant level of 70° C.

After arrival of the consumption of TFE by the reaction at 1735 g, the feeding of TFE was discontinued and the stirring was stopped. The autoclave inside gas was released until ordinary pressure and the contents were then taken out; the reaction was thus terminated.

The modified PTFE aqueous dispersion obtained had a solid matter content of 29.5% by mass and an average primary particle diameter of 0.22 μm.

The modified PTFE aqueous dispersion obtained was diluted to a solid matter concentration of about 15% by mass with deionized water, the dilution was stirred vigorously until coagulation, and the thus-obtained coagulated matter was recovered and dried at 145° C. for 18 hours to give a modified PTFE powder.

Using the modified PTFE powder obtained, the PPVE and HFP contents in the modified PTFE were determined and found to be 0.165% by mass and 0.05% by mass, respectively. The modified PTFE had a standard specific gravity [SSG] of 2.168.

Further, the modified PTFE powder was subjected to thermal instability index, extrusion pressure and green strength measurements. Further, molded articles were prepared therefrom and measured for haze.

EXAMPLE 2

A modified PTFE powder was produced and subjected to various measurements in the same manner as in Example 1 except that perfluoro-2,2-dimethyl-1,3-dioxole [PDD] was used as the initially introduced modifier, the levels of addition of the initially introduced modifier and additional modifier were changed and 7.4 cc of isobutane was fed as a chain transfer agent simultaneously with the addition of the additional modifier.

EXAMPLE 3

A stainless steel (SUS 316) autoclave (capacity: 6 L) equipped with a stainless steel (SUS 316) anchor-shaped stirrer and a jacket for temperature control was charged with 3580 g of deionized water, 94.1 g of paraffin wax and 0.72 g of ammonium perfluorooctanoate as a dispersant. Then, while heating the autoclave to 70° C., the oxygen in the system was eliminated by 3 times of nitrogen gas substitution and 2 times of TFE gas substitution. Thereafter, the inside pressure was raised to 0.73 MPa with TFE gas, the contents were stirred at 280 rpm, and the inside temperature was maintained at 70° C.

Then, 2.2 g of PPVE was injected into the autoclave as an initially introduced modifier, followed by injection of a solution of 322 mg of DSP in 20 g of deionized water and a solution of 13.4 mg of APS in 20 g of deionized water; the autoclave inside pressure was 0.78 MPa.

At the time of arrival of the consumption of TFE by the reaction after addition of the polymerization initiator at 230 g (20% conversion), 4.54 g of ammonium perfluorooctanoate was fed and, thereafter, TFE was fed until the inside pressure reached 0.78 MPa, and stirring was restarted at 280 rpm and the reaction was allowed to proceed continuedly.

At the time of arrival of the consumption of TFE by the reaction at 1490 g (90% conversion), 7.1 g of HFP as an additional modifier and 7.4 ml of isobutane as a chain transfer agent were fed, and the reaction was allowed to proceed continuedly.

Since otherwise the autoclave inside pressure lowered with the progress of the reaction, TFE was continuously fed to always maintain the pressure of 0.78 MPa throughout the whole reaction process. The rate of stirring was maintained at a constant level of 280 rpm, and the reaction temperature at a constant level of 70° C.

After arrival of the consumption of TFE by the reaction at 1735 g, the feeding of TFE was discontinued and the stirring was stopped. The autoclave inside gas was released until ordinary pressure and the contents were then taken out; the reaction was thus terminated.

The modified PTFE aqueous dispersion obtained had a solid matter content of 31.5% by mass and an average primary particle diameter of 0.24 μm.

The modified PTFE aqueous dispersion obtained was diluted to a solid matter concentration of about 15% by mass with deionized water, the dilution was stirred vigorously until coagulation, and the thus-obtained coagulated matter was recovered and dried at 145° C. for 18 hours to give a modified PTFE powder.

The PPVE and HFP contents in the modified PTFE obtained were determined and found to be 0.103% by mass and 0.03% by mass, respectively. The modified PTFE had a standard specific gravity [SSG] of 2.173.

Further, the modified PTFE powder was subjected to thermal instability index, extrusion pressure, green strength and haze value measurements.

EXAMPLE 4

A modified PTFE powder was produced and subjected to various measurements in the same manner as in Example 3 except that the kind and amount of the additional modifier were changed as shown in Table 1.

EXAMPLES 5 AND 6

Modified PTFE powders were produced and subjected to various measurements in the same manner as in Example 4 except that the initiator APS (Example 5) or DSP (Example 6) was added in lieu of the chain transfer agent.

EXAMPLE 7

A modified PTFE powder was produced and subjected to various measurements in the same manner as in Example 4 except that the kind and amount of the additional modifier were changed as shown in Table 1.

The measurement results obtained in each of the above examples are shown in Table 1.

TABLE 1

|  |  | Example 1 | Example 2 | Example 3 | Example 4 | Example 5 | Example 6 | Example 7 |
|---|---|---|---|---|---|---|---|---|
| Modifier (amount added) (g) | Particle core | PPVE (2.9) | PDD (25) | PPVE (2.2) | PPVE (2.2) | PPVE (2.2) | PPVE (2.2) | PPVE (2.2) |
|  | Particle shell | HFP (14.2) | HFP (3.55) | HFP (7.1) | HFP (3.55) | HFP (3.55) | HFP (3.55) | PPVE (2.2) |
| Modification degree (mass %) | Particle core | 0.165 | 0.100 | 0.103 | 0.108 | 0.103 | 0.096 | 0.090 |
|  | Particle shell | 0.05 | 0.02 | 0.03 | 0.03 | 0.03 | 0.02 | 0.039 |
| Chain transfer agent (amount added) |  | — | Isobutane (7.4 cc) | Isobutane (7.4 cc) | Methanol (0.5 g) | APS (50 ppm) | DSP (400 ppm) | Methanol (0.5 g) |
| Average particle diameter (μm) |  | 0.22 | 0.25 | 0.24 | 0.25 | 0.24 | 0.21 | 0.23 |
| Standard specific gravity |  | 2.168 | 2.156 | 2.173 | 2.171 | 2.171 | 2.171 | 2.171 |
| Thermal instability index |  | 1 | 5 | 0 | 0 | −2 | −1 | −3 |
| Extrusion pressure (MPa) |  | 41.0 | 37.3 | 39.5 | 33.9 | 36.4 | 37.8 | 36.7 |
| Green strength (MPa) |  | — | 2.22 | 2.11 | 1.97 | 2.15 | 1.91 | 2.19 |
| Haze value |  | 52 | 58 | 58 | 51 | 50 | 58 | 57 |

In Table 1, the amounts of the chain transfer agents added as given referring to Example 5 and Example 6 are proportions relative to 3580 g of deionized water. The modified PTFE powders obtained in the respective examples were all high in green strength and the extrusion pressures in the molding thereof were low. In particular, for the modified PTFE powder obtained in Example 4 by adding HFP as an additional modifier and methanol as a chain transfer agent, the extrusion pressure was low. The haze values measured for the respective modified PTFE powders also showed low values. The modified PTFE powders obtained in Example 4 and Example 5 by addition of HFP as an additional modifier were low in haze value.

EXAMPLE 8

A stainless steel (SUS 316) autoclave (capacity: 6 L) equipped with a stainless steel (SUS 316) anchor-shaped stirrer and a jacket for temperature control was charged with 3580 g of deionized water, 94.1 g of paraffin wax and 3.58 g of ammonium perfluorooctanoate as a dispersant. Then, while heating the autoclave to 70° C., the oxygen in the system was eliminated by 3 times of nitrogen gas substitution and 2 times of tetrafluoroethylene [TFE] gas substitution. Thereafter, the inside pressure was raised to 0.73 MPa with TFE gas, the contents were stirred at 280 rpm, and the inside temperature was maintained at 70° C.

Then, 0.85 g of perfluoro(propyl vinyl ether) [PPVE] and 0.34 g of hexafluoropropylene [HFP] were injected into the autoclave each as an initially introduced modifier, followed by injection of a solution of 322 mg of disuccinoyl peroxide [DSP] in 20 g of deionized water and a solution of 13.4 mg of ammonium persulfate [APS] in 20 g of deionized water; the autoclave inside pressure was 0.78 MPa.

At the time of arrival of the consumption of TFE by the reaction at 1490 g (90% conversion), 3.5 g of hexafluoropropylene [HFP] as an additional modifier and 0.4 g of methanol as a chain transfer agent were fed, and the reaction was allowed to proceed continuedly.

Since otherwise the autoclave inside pressure lowered with the progress of the reaction, TFE was continuously fed to always maintain the pressure of 0.78 MPa throughout the whole reaction process. The rate of stirring was maintained at a constant level of 280 rpm, and the reaction temperature at a constant level of 70° C.

After arrival of the consumption of TFE by the reaction at 1735 g, the feeding of TFE was discontinued and the stirring was stopped. The autoclave inside gas was released until ordinary pressure and the contents were then taken out; the reaction was thus terminated.

The modified PTFE aqueous dispersion obtained had a solid matter content of 31.5% by mass and an average primary particle diameter of 0.24 μm.

The modified PTFE aqueous dispersion obtained was diluted to a solid matter concentration of about 15% by mass with deionized water, the dilution was stirred vigorously until coagulation, and the thus-obtained coagulated matter was recovered and dried at 145° C. for 18 hours to give a modified PTFE fine powder.

The PPVE and HFP contents in the particle pore portion were determined, giving the respective values shown in Table 2. The modified PTFE had a standard specific gravity [SSG] of 2.180.

Further, the above modified PTFE fine powder was subjected to thermal instability index, extrusion pressure, green strength and haze value measurements. Further, measurement target covered wire specimens a were prepared and subjected to core conductor adhesion strength and self-wound heat resistance measurements.

EXAMPLE 9

A stainless steel (SUS 316) autoclave (capacity: 6 L) equipped with a stainless steel (SUS 316) anchor-shaped stirrer and a jacket for temperature control was charged with 3580 g of deionized water, 94.1 g of paraffin wax and 0.72 g of ammonium perfluorooctanoate as a dispersant. Then, while heating the autoclave to 70° C., the oxygen in the system was eliminated by 3 times of nitrogen gas substitution and 2 times of tetrafluoroethylene [TFE] gas substitution. Thereafter, the inside pressure was raised to 0.73 MPa with TFE gas, the contents were stirred at 280 rpm, and the inside temperature was maintained at 70° C.

Then, 1.0 g of perfluoro(propyl vinyl ether) [PPVE] and 0.34 g of hexafluoropropylene [HFP] were injected into the autoclave, each as an initially introduced modifier, followed by injection of a solution of 220 mg of disuccinoyl peroxide [DSP] in 20 g of deionized water and a solution of 13.4 mg of ammonium persulfate [APS] in 20 g of deionized water; the autoclave inside pressure became 0.78 MPa.

At the time of arrival of the consumption of TFE by the reaction after addition of the polymerization initiators at 230 g (20% conversion), 4.54 of ammonium perfluorooctanoate was fed, TFE was then fed until the inside pressure became 0.78 MPa, and the stirring was restarted at 280 rpm and the reaction was allowed to proceed continuedly.

At the time of arrival of the consumption of TFE by the reaction at 1490 g (90% conversion), 3.5 g of hexafluoropropylene [HFP] as an additional modifier and 0.3 g of methanol as a chain transfer agent, and the reaction was allowed to proceed continuedly.

Since otherwise the autoclave inside pressure lowered with the progress of the reaction, TFE was continuously fed to always maintain the pressure of 0.78 MPa throughout the whole reaction process. The rate of stirring was maintained at a constant level of 280 rpm, and the reaction temperature at a constant level of 70° C.

After arrival of the consumption of TFE by the reaction at 1735 g, the feeding of TFE was discontinued, and the stirring was stopped. The autoclave inside gas was released to ordinary pressure and the contents were then taken out; the reaction was thus terminated.

The modified PTFE aqueous dispersion obtained had a solid matter content of 31.2% by mass and an average primary particle diameter of 0.23 μm.

The modified PTFE aqueous dispersion obtained was diluted to a solid matter concentration of about 15% by mass with deionized water, the dilution was stirred vigorously until coagulation, and the thus-obtained coagulated matter was recovered and dried at 145° C. for 18 hours to give a modified PTFE powder.

The particle core PPVE and HFP contents were determined to give the respective values shown in Table 2. The modified PTFE had a standard specific gravity [SSG] of 2.175.

Further, the above modified PTFE fine powder was subjected to thermal instability index, extrusion pressure, green strength and haze value measurements. Further, measurement target covered wire specimens a were prepared for core conductor adhesion strength and self-wound heat resistance measurements.

EXAMPLE 10

A modified PTFE fine powder was produced and subjected to various measurements in the same manner as in Example 8 except that the additional modifiers species and the amounts thereof added were changed as shown in Table 2.

The measurement results obtained in Examples 8 to 10 are shown in Table 2.

TABLE 2

|  |  | Example 8 | Example 9 | Example 10 |
|---|---|---|---|---|
| Modifier (amount added) (g) | (Particle core) Modifier 1 | PPVE (0.85 g) | PPVE (1.0 g) | PPVE (0.85 g) |
|  | (Particle core) Modifier 2 | HFP (0.34 g) | HFP (0.34 g) | HFP (0.34 g) |
|  | Particle shell | HFP (3.5 g) | HFP (3.5 g) | PPVE (0.5 g) |
| Modification degree (mass %) | (Particle core) Modifier 1 | 0.037 | 0.032 | 0.035 |
|  | (Particle core) Modifier 2 | 0.01 | 0.01 | 0.01 |
|  | Particle shell | 0.03 | 0.03 | 0.05 |
| Chain transfer agent (amount added) | | Methanol (0.4 g) | Methanol (0.3 g) | Methanol (0.4 g) |
| Average particle diameter (μm) | | 0.24 | 0.23 | 0.23 |
| Standard specific gravity | | 2.180 | 2.175 | 2.170 |
| Thermal instability index | | 3 | 2 | 2 |
| Extrusion pressure (MPa) | | 34.3 | 32.5 | 38.7 |
| Green strength (MPa) | | 2.0 | 1.9 | 2.5 |

TABLE 2-continued

|  | Example 8 | Example 9 | Example 10 |
|---|---|---|---|
| Haze value | 57 | 58 | 50 |
| Core adhesion strength (kgf) | 1.7 | 1.6 | 1.6 |
| Self-wound heat resistance | 0 | 0 | 0 |

The modified PTFE fine powders of Examples 8 to 10 showed favorable values with respect to all the thermal instability index, extrusion pressure, green strength and haze value. Further, in Examples 8 to 10, the core conductor adhesion strength and self-wound heat resistance were also good.

COMPARATIVE EXAMPLE 1

A TFE polymer powder comprising a PPVE unit-containing TFE polymer was prepared by emulsion polymerization according to the method described in WO 00/02935 (in Example 2).

Using the TFE polymer powder obtained, the PPVE content in the TFE polymer was determined and found to be 0.106% by mass. The TFE polymer powder had a standard specific gravity [SSG] of 2.177.

Further, the thermal instability index, extrusion pressure and haze value were measured for the TFE polymer powder.

COMPARATIVE EXAMPLE 2

A TFE polymer powder comprising a bilayer-structured TFE polymer containing CTFE units in both the particle core and particle shell was prepared according to the method described in Japanese Patent Publication S56-26242 (in Example 7).

Using the TFE polymer powder obtained, the CTFE content in the TFE polymer was measured and found to be 0.770% by mass.

Further, for the TFE polymer powder, the extrusion pressure and haze value were measured.

COMPARATIVE EXAMPLES 3 AND 4

A TFE polymer powder comprising a bilayer-structured TFE polymer containing PPVE units in the particle core and CTFE units in the particle shell was prepared according to the method described in Japanese Kokai Publication S63-56532 [in Example 4 (Comparative Example 3) or in Example 8 (Comparative Example 4)].

Using each TFE polymer powder, the PPVE unit and CTFE unit contents were measured.

Further, for each TFE polymer powder, the extrusion pressure and haze value were measured.

COMPARATIVE EXAMPLE 5

A TFE polymer powder comprising a bilayer-structured TFE polymer containing perfluoro(butyl vinyl ether) PBVE units in the particle core and HFP units in the particle shell was prepared according to the method described in Japanese Kokai Publication H08-26102 [in Example 2].

Using the TFE polymer powder obtained, the PBVE unit and HFP unit contents were measured.

Further, for the TFE polymer powder, the extrusion pressure and haze value were measured.

The results obtained in each comparative example are shown in Table 3.

TABLE 3

|  |  | Comparative Example 1 | Comparative Example 2 | Comparative Example 3 | Comparative Example 4 | Comparative Example 5 |
|---|---|---|---|---|---|---|
| Modifier (amount added) | Particle core | PPVE (2.5 g) | — | PPVE (0.3 g) | PPVE (0.5 g) | PBVE |
|  | Particle shell |  | CTFE (0.5 mol) | CTFE | CTFE (6.0 g) | HFP |
| Modification degree (mass %) | Particle core | 0.110 | — | 0.020 | 0.030 | 0.030 |
|  | Particle shell | — | 0.770 | 0.050 | 0.245 | 0.031 |
| Particle core percentage |  | 0.85 | 0.85 | 0.95 | 0.91 | 0.80 |
| Standard specific gravity |  | 2.177 | — | 2.177 | 2.180 | 2.190 |
| Thermal instability index |  | 0 | — | 4 | 25 | −4 |
| Extrusion pressure (MPa) |  | 60.0 | 48.5 | — | — | 56.2 |
| Green strength (MPa) |  | — | — | — | — | — |
| Haze value |  | 52 | 80 | 72 | 71 | 66 |

(Note)
Where no specific values are given, no measurements were carried out.

Some of the molded articles formed of the TFE polymer powders obtained in the respective comparative examples are considered to be high in green strength because of the high extrusion pressures. It was further found that since the haze value measured in each comparative example was high, the molded articles obtained from the TFE polymer of each comparative example are inferior in transparency to the molded articles obtained from the modified PTFE powders obtained in the examples according to the present invention.

INDUSTRIAL APPLICABILITY

The modified PTFE fine powder of the invention, which has the constitution described hereinabove, is superior in paste extrusion performance and can be processed into molded articles excellent in transparency, thermal stability and chemical resistance, among others.

The modified PTFE molded article according to the invention, which has the constitution described hereinabove, is superior in transparency, heat resistance and chemical resistance, among others, and can be suitably used, for example, in or as electric wire coverings, tubes and like molded articles in the fields of aircrafts, automobiles, medical instruments and devices, precision machines and instruments, etc.

BRIEF DESCRIPTION OF THE DRAWING

FIG. 1 This FIGURE is a photograph showing a self-wound heat resistance test specimen formed by using a measurement target covered wire a.

The invention claimed is:

1. A modified polytetrafluoroethylene fine powder constituting a particle core and a particle shell,
wherein said particle core comprises a modified polytetrafluoroethylene (i) resulting from copolymerization with at least one modifier selected from the group consisting of a fluoro(alkyl vinyl ether) represented by the general formula (I):

   $F_2C=CFO(CF_2)_{n1}X^1$   (I)

(wherein $X^1$ represents hydrogen atom or fluorine atom and n1 represents an integer of 1 to 6), and a fluoroolefin represented by the general formula (III):

   $CX^4X^5=CX^6(CF_2)_{n2}F$   (III)

(wherein $X^4$, $X^5$ and $X^6$ each represents hydrogen atom or fluorine atom provided that at least one of them represents fluorine atom; and n2 represents an integer of 1 to 5) and the modifier-derived modifier unit content in the particle core is 0.01 to 0.5% by mass based on all the primary particles constituting the modified PTFE fine powder,
said particle shell comprises a modified polytetrafluoroethylene (ii),
wherein the modification in the modified polytetrafluoroethylene (ii) is carried out by using a chain transfer agent and by copolymerizing a fluoro (alkyl vinyl ether) represented by the general formula (I):

   $F_2C=CFO(CF_2)_{n1}X^1$   (I)

(wherein $X^1$ represents hydrogen atom or fluorine atom and n1 represents an integer of 1 to 6)
or a fluoroolefin represented by the general formula (III):

   $CX^4X^5=CX^6(CF_2)_{n}F$   (III)

(wherein $X^4$, $X^5$ and $X^6$ each represents hydrogen atom of fluorine atom provided that at least one of them represents fluorine atom; and n2 represents an integer of 1 to 5) as a modifier,
the chain transfer agent comprises at least one member selected from the group consisting of water-soluble alcohols containing 1 to 4 carbon atoms, hydrocarbons containing 1 to 4 carbon atoms and fluorinated hydrocarbons containing 1 to 4 carbon atoms,
wherein the content of a modifier unit derived from the modifier in the particle shell is 0.005 to 0.5% by mass based on all primary particles constituting the modified PTFE fine powder, and
said modified polytetrafluoroethylene fine powder has the cylinder extrusion pressure at a reduction ratio of 1600, using an extruder according to ASTM D 4895, of not higher than 50 MPa.

2. The modified polytetrafluoroethylene fine powder according to claim 1,
wherein the haze value of molded article a for measurement formed therefrom is not higher than 60.

3. A modified polytetrafluoroethylene molded article obtained by molding/processing a modified polytetrafluoroethylene fine powder,
wherein said modified polytetrafluoroethylene fine powder is the modified polytetrafluoroethylene fine powder according to claim 1, and
the tensile strength of the molded article for measurement is not lower than 1.8 MPa.

4. The modified polytetrafluoroethylene molded article according to claim 3,
which is a tube.

5. The modified polytetrafluoroethylene fine powder according to claim 1, wherein the chain transfer agent comprises at least one member selected from the group consisting of water-soluble alcohols containing 1 to 4 carbon atoms.

6. The modified polytetrafluoroethylene fine powder according to claim 1,
wherein the chain transfer agent is methanol.

\* \* \* \* \*